United States Patent [19]

Osawa

[11] Patent Number: 5,174,409
[45] Date of Patent: Dec. 29, 1992

[54] SAFETY SYSTEM FOR VEHICLE

[75] Inventor: Satoshi Osawa, Kanagawa, Japan

[73] Assignee: Nissan Motor Co. Ltd., Kanagawa, Japan

[21] Appl. No.: 759,366

[22] Filed: Sep. 13, 1991

[30] Foreign Application Priority Data

Sep. 18, 1990 [JP] Japan .................. 2-248150

[51] Int. Cl.⁵ .................. B60R 21/00; B62D 1/19
[52] U.S. Cl. .................. 180/274; 280/777;
280/806; 280/750
[58] Field of Search .......... 180/232, 274; 280/748,
280/777, 750, 806, 801

[56] References Cited

U.S. PATENT DOCUMENTS

| | | | |
|---|---|---|---|
| 4,703,827 | 11/1987 | Vollmer et al. | 180/232 |
| 4,795,189 | 1/1989 | Vollmer et al. | 180/274 |
| 4,823,905 | 4/1989 | Piech | 180/274 |
| 4,884,652 | 12/1989 | Vollmer | 280/806 |
| 5,054,810 | 10/1991 | Backhaus et al. | 180/274 |

FOREIGN PATENT DOCUMENTS 3720343 1/1989 Fed. Rep. of Germany ...... 280/748
52-119226 9/1977 Japan .

Primary Examiner—Charles A. Marmor
Assistant Examiner—Tamara Graysay
Attorney, Agent, or Firm—Pennie & Edmonds

[57] ABSTRACT

A safety system for protecting a driver of a vehicle has a single continuous safety cable designed to retract a steering column and at the same time pull a driver's seat belt when an engine is shoved rearward in a head-on collision of the vehicle. A cable portion for pulling the steering column is connected in series with a cable portion for pulling the seat belt so that the steering column is retracted only when the driver's seat belt is fastened. When the driver's seat belt is fastened, the safety cable system protects the driver by increasing the seat belt tension and retracting the steering column. When the driver's seat belt is not fastened, the safety cable system leaves the steering column at its normal position to absorb impact energy of a secondary collision of the driver against the steering wheel.

15 Claims, 2 Drawing Sheets

SAFETY SYSTEM FOR VEHICLE

BACKGROUND OF THE INVENTION

The present invention relates to a safety system or apparatus for protecting a person or persons in a vehicle, and more specifically to a safety cable system or apparatus for protecting a driver by retracting a steering column and increasing a belt tension of a seat belt assembly in response to a backward movement of an engine of the vehicle in a head-on collision of the vehicle.

Japanese Utility Model Provisional (KOKAI) Publication No. 52-119226 discloses a safety cable system connecting a seat belt assembly and a steering column. This cable system is arranged to retract the steering column toward the front of the vehicle by utilizing a belt tension produced by an inertial force of a seat occupant in a vehicle's collision (primary collision) in order to reduce the danger of a collision between the steering wheel and the head or upper torso of the driver (secondary collision). In this cable system, however, the belt tension is not produced until the driver is thrown toward the front of the vehicle through a predetermined distance. Therefore, this system entails a delay in securing the driver with the seat belt.

FIG. 3 shows another prior art safety cable system which includes a cable 1 having one end connected with a seat belt 2 of a front passenger seat, and the other end which is bifurcated into a first branch portion connected with a seat belt 3 of a driver's seat, and a second branch portion connected with a steering column 4. The cable 1 is passed round two support posts 5 and hooked by an engine 6, as shown in FIG. 3. In a head-on collision of the vehicle, the engine 6 is shoved backward to a position shown by a broken line in FIG. 3. Therefore, the cable 1 increases the tensions of the seat belts 2 and 3, and at the same time pulls the steering column 4 together with a steering wheel 7 toward the front of the vehicle.

When the seat belts 2 and 3 are in a fastened (restraint) state for protecting a seat occupant, this cable system can protect the driver and passenger against a secondary collision by immediately increasing the belt tension on a primary collision. However, when the driver's seat belt 3 is not in the fastened state, that is, the driver is not secured by the seat belt 3, then the steering column 4 is retracted by the cable 1 before a secondary collision of the driver, and therefore, the steering column 4 becomes unable to absorb the energy of the secondary collision.

SUMMARY OF THE INVENTION

It is an object of the present invention to provide a safety cable system or apparatus which can protect a seat occupant whether a seat belt assembly is in a fastened state or not.

According to the present invention, a safety system for a vehicle, comprises a safety cable comprising first, second and third cable portions. The first cable portion is caught by an engine of the vehicle, and forced to move in a rearward direction of the vehicle and to increase a cable tension of the safety cable by the engine when the engine is moved in the rearward direction in a head-on collision of the vehicle. The second cable portion is connected with a steering column of the vehicle, and arranged to pull the steering column in a forward direction of the vehicle when the cable tension of the safety cable is increased. The third cable portion is connected with a first seat belt assembly and arranged to apply a pulling force to the first seat belt assembly so as to increase a belt tension of the first seat belt assembly when the cable tension of the safety cable is increased while the first seat belt assembly is in a fastened state. The first, second and third cable portions are connected so as to form a single continuous line.

DETAILED DESCRIPTION OF THE INVENTION

Figure 1:
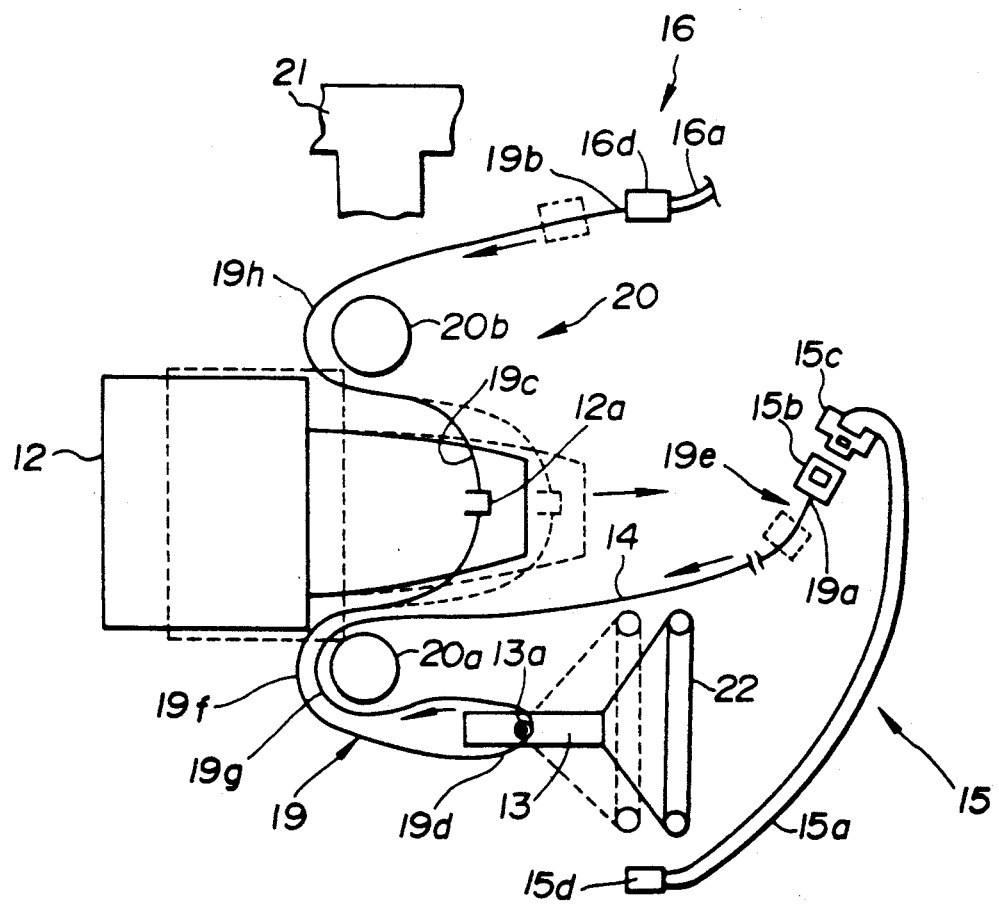
FIG. 1 is a schematic top plan view showing a safety cable system according to a first embodiment of the present invention.

As shown in FIG. 1, a safety system according to a first embodiment of the present invention comprises a continuous flexible safety cable 19. The safety cable 19 extends continuously from a first cable end 19a to a second cable end 19b in the form of a single continuous winding line. The safety cable 19 of this embodiment has only these two ends 19a and 19b, and has not other end. The safety cable 19 of this embodiment is branchless.

The safety cable 19 has a first cable portion 19c which is caught by an engine (or engine assembly) 12 of the vehicle, so that the safety cable 19 is pulled in a rearward direction toward the rear of the vehicle along a longitudinal axis of the vehicle by the engine (assembly) 12 if the engine 12 is shoved in the rearward direction in a head-on collision of the vehicle. A first cable holder 12a is fixed to the engine 12. The first cable holder 12a may be an integral part of a housing member of the engine (assembly) 12. The first cable holder 12a serves as a first holding means for holding the first cable portion 19c at a first position shown by a solid line in FIG. 1. The first cable holder 12a may be a projection formed with a hole through which the cable 19 passes and moves, or may be shaped like a hook, or may comprise a pulley for carrying the cable 19. The engine (assembly) 12 is normally held at a normal engine position shown by solid lines in FIG. 1. The engine (assembly) 12 is displaced in the rearward direction to a displaced position shown by broken lines in FIG. 1 is a frontal impact is applied to the front of the vehicle. In this embodiment, the first cable portion 19c is somewhat sharply bent when the safety cable 19 is tense.

The safety cable 19 further has a second cable portion 19d which is caught by a steering column 13 and designed to retract the steering column 13 together with a steering wheel 22 from a normal column position shown by solid lines in FIG. 1 to a retracted position shown by broken lines, by pulling the steering column 13 in a forward direction toward the front of the vehicle. A second cable holder 13a is formed in the steering column 13. The second holder 13a may be an integral part of, or fixed to, a nonrotational member of the steering column 13. The second cable holder 13a serves as a second holding means for holding the second cable portion 19a at a second position. The second cable holder 13a of this embodiment is a projection which is formed in the steering column 13 and designed to function as a hook. The second cable portion 19d is also sharply bent. In this embodiment, the steering column 13 is of a collapsible type designed to absorb impact energy.

The safety cable 19 further has a third cable portion 19e which is connected with a first seat belt assembly 15 for a driver's seat. The first seat belt assembly 15 comprises a seat belt 15a, a belt connector 15b, a tongue 15c and a belt end metal member 15d. In this embodiment, the seat belt 15a is a webbing, and the belt connector 15b is a buckle. The driver's seat belt assembly 15 is in a fastened state when the tongue 15c is inserted into the buckle 15b and latched in the buckle 15b. The belt assembly 15 is in a released state when the tongue 15c is disconnected from the buckle 15b. The third cable portion 19e of the safety cable 19 can pull the belt webbing 15a and increase the belt tension only when the belt assembly 15 is in the fastened state. In this embodiment, the first cable end 19a of the safety cable 19 is contained in the third cable portion 19e, and connected with the buckle 15b of the driver's seat belt assembly 15 in such a manner that the third cable portion 19e can pull the buckle 15b. From the first cable end 19a, the third cable portion 19e extends in such a direction that the third cable portion can increase the belt tension by pulling the buckle 15b when the seat belt assembly 15 is in the fastened state. The buckle 15b is movable to a limited extent.

First and second support posts (or support members) 20a and 20b are fixed to a main body structure 21 of the vehicle. FIG. 1 shows only a small portion of the main body structure 21. In a front collision, the engine 12 is displaced in the rearward direction relative to the support posts 20a and 20b and relative to the main body structure 21. When the steering column 13 is strongly pulled by the safety cable 19, the steering column 13 is displaced relative to the main body structure 21 and the support posts 20a and 20b. Each of the support posts 20a and 20b has a smooth convex outside surface. In this embodiment, each of the support posts 20a and 20b extends along the vertical z axis of the vehicle, and has a cylindrical outside surface.

The safety cable 19 further has fourth and fifth cable portions 19f and 19g which, in this embodiment, both extend around the first support post 20a. Each of the fourth and fifth cable portions 19f and 19g describes a semicircle around the first support posts 20a. The fourth cable portion 19f is intermediate between the first and second cable portions 19c and 19d along the longitudinal line of the sinuous safety cable 19. The fifth cable portion 19g is intermediate between the first and third cable portions 19c and 19e along the safety cable 19. In this embodiment, the second cable portion 19d is intermediate between the first and third cable portions 19c and 19e, and the fifth cable portion 19g is intermediate between the second and third cable portions 19d and 19e. Each of the fourth and fifth cable portions 19f and 19g is bent in the shape of a U by the first support post 20a. The first support post 20a is located ahead of any of the first and second cable holders 12a and 13a, and the buckle 15b of the seat belt assembly 15. That is, the support post 20a is closest to the front of the vehicle, and remotest from the rear of the vehicle.

The safety cable 19 of this embodiment further has a sixth cable portion 19h which is intermediate between the first cable portion 19c and the second cable end 19b. The sixth cable portion 19h is bent in the U shape by the second support post 20b. The second support post 20b is located ahead of the first cable holder 12a.

In the first embodiment, the second cable end 19b of the safety cable 19 is connected with a second seat belt assembly 16 of a front passenger's seat. The second seat belt assembly 16 is substantially identical to the first seat belt assembly 15. In the first embodiment, the second cable end 19b is connected with a belt end member 16d of the second seat belt assembly 16 in such a manner that the safety cable 19 can pull the belt end member 16d. The safety cable 19 is always connected with a seat belt 16a of the second seat belt assembly 16 in such a manner that the safety cable 19 can pull the seat belt 16a. The belt end member 16d is movable to a limited extent relative to the main body structure 21, and capable of pulling the second seat belt 16a. This limited extent of the belt end member 16d of the second seat belt assembly 16 is smaller than that of the buckle 15b of the first seat belt assembly 15.

Thus, the safety cable 19 of the first embodiment extends from the second end 19b to the first end 19a, through the second support post 20b, the first cable holder 12a, the first support post 20a, the second cable holder 13a and the first support post 20a. Each of the first and second cable holders 12a and 13a and the support posts 20a and 20b changes the direction of the safety cable 19. The safety cable 19 of this embodiment is in the form of a continuous single line, and each of the first through sixth cable portions 19c–19h is in the form of a line segment of the single line. The cable portions 19c–19h are connected in series so as to form a continuous single path for transmitting a pulling force from the first end 19a to the second end 19b. Each cable portion is not fixed, but slidable along the longitudinal line of the cable 19.

If a frontal collision of the vehicle causes a rearward displacement of the engine 12 relative to the vehicle main body structure 21 from the normal position shown by the solid lines in FIG. 1 to the displaced position shown by the broken lines while the driver's seat belt assembly 15 is in the fastened state, then the safety cable 19 increases the tension of the seat belt 15a by pulling the buckle 15b, and at the same time pulls the steering column 13 and the steering wheel 22 from the normal position toward the front of the vehicle. Therefore, the seat belt 15 prevents the driver from being thrown violently toward the front of the vehicle by an inertial force, by restraining the driver immediately without delay, and securely with the preliminarily given belt tension (preload). On the other hand, the steering column 13 with the steering wheel 22 is retracted toward the front of the vehicle. Thus, this safety system reliably prevents a secondary collision between the driver and the steering wheel 22 by securing the driver with the seat belt 15 and simultaneously retracting the steering wheel 22. If the second seat belt 16 is also fastened, then the safety cable 19 of this embodiment pulls the second seat belt 16 too, and secures to passenger in the front passaenger's seat.

If a frontal collision occurs when the driver's seat belt assembly 15 is not in the fastened state, then the safety cable 19 leaves the steering column 13 in the normal projected position in spite of a rearward displacement of the engine 12. The safety cable 19 does not retract the steering column 13 because the tongue 15c is disconnected from the buckle 15b. In the released state of the driver's seat belt assembly 15, the safety cable 19 pulls only the buckle 15b which is disconnected from the belt 15a. Therefore, only the buckle 15b moves relative to the main body structure 21, and the safety cable 19 can neither increase its own tension nor retract the steering column 13. In this case, the driver is thrown forwardly by the inertial force, and collides against the steering wheel 22. However, the steering column 13 collapses and absorbs impact energy of the secondary collision. This safety system can mitigate the results of a front end collision of the vehicle by making proper use of the collapsible steering column 13 even if the driver fails to fasten the seat belt.

In this embodiment, the first end 19a of the safety cable 19 is connected with the buckle 15b of the first seat belt assembly 15, and the buckle 15b is movable in a relatively wide range. Therefore, the first seat belt assembly 15 in the released state does not impose a constraint on the first end 19a of the safety cable 19, so that the steering column 13 is not drawn back by the safety cable 19. The second end 19b of the safety cable 19 is connected with the belt end metal member 16d which is movable only in a narrow range. Therefore, the second seat belt assembly 16 imposes a constraint on the second end 19b of the safety cable 19 regardless of whether the second seat belt assembly is in the fastened state or the released state. When the second seat belt assembly 16 is in the fastened state, the safety cable 19 increases the tension of the second seat belt 16a in accordance with a rearward displacement of the engine.

Figure 2:
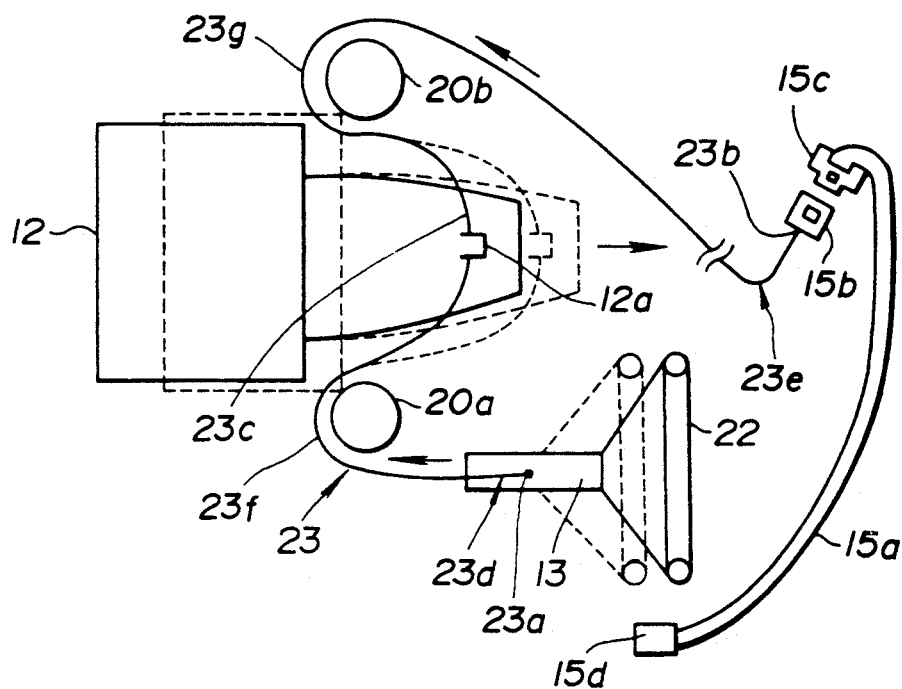
FIG. 2 is a schematic top plan view showing a safety cable system according to a second embodiment of the present invention.
Figure 3:
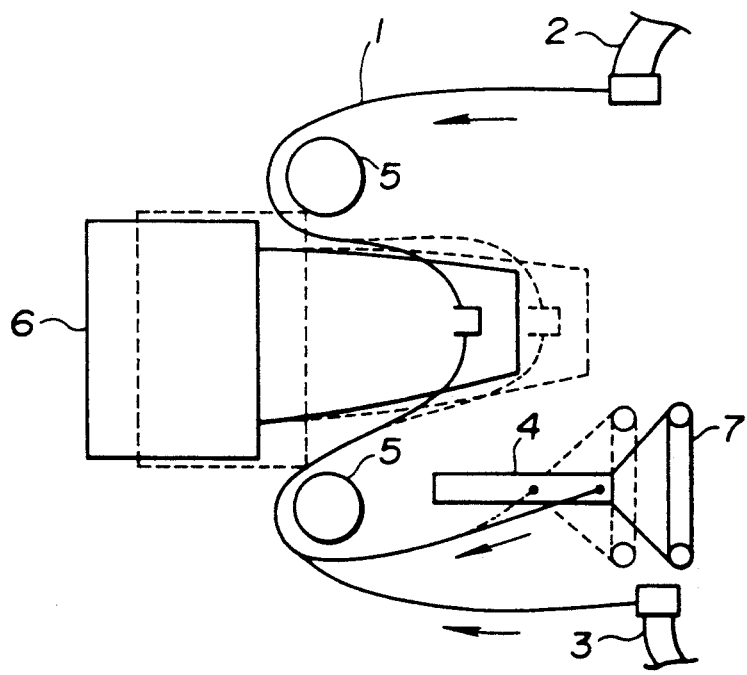
FIG. 3 is a schematic top plan view showing a conventional safety cable system.

FIG. 2 shows a safety cable system according to a second embodiment of the present invention. A safety cable 23 of the second embodiment also has only two cables ends 23a and 23b. The first cable end 23a is connected with the steering column 13 so that the safety cable 23 can pull the steering column 13. The second cable end 23b is connected with the buckle 15b of the driver's seat belt assembly 15 so that the safety cable 23 can pull the buckle 15b.

The safety cable 23 has a first cable portion 23c which is caught by the engine 12 in the same manner as in the first embodiment. In the second embodiment, the first cable end 23a is contained in a second cable portion 23d, and therefore, the second cable portion 23d is connected with the steering column 13 in such a manner that the second cable portion 23d can pull the steering column 13. The second cable end 23b is contained in a third cable portion 23e, and therefore, the third cable portion 23e is connected with the buckle 15b of the driver's seat belt assembly 15 in such a manner that the third cable portion 23e can pull the buckle 15b. The first cable portion 23c is intermediate between the second and third cable portions 23d and 23e. The first, second and third cable portions 23c, 23d and 23e are connected in series so as to form a single continuous line.

The safety cable 23 further has a fourth cable portion 23f between the first and second cable portions 23c and 23d, and a fifth cable portion 23g between the first and third cable portions 23c and 23e. The fourth and fifth cable portions 23f and 23g are curved, respectively, by the first and second support posts 20a and 20b as in the first embodiment.

The safety cable system of the second embodiment is also designed to retract the steering column 13 only when the driver's seat belt is fastened by inserting the tongue 15c into the slit of the buckle 15b. The safety cable 23 of the second embodiment is not connected with the second seat belt assembly of the front passenger's seat.

In the first embodiment shown in FIG. 1, it is optional to fix the first cable portion 19c to the engine 12. In the second embodiment, however, the first cable holder 12a catches the first cable portion 23 in such a slidable manner that the first cable portion 23 is slidable through the first cable holder 12a. In each of the first and second embodiments, the safety cable 19 or 23 is a steel cable. The tongue 15c may be fixed to one end of the belt 15a, or may be a sliding tongue slidable along the belt 15a.

What is claimed is:

1. A safety system for a vehicle, comprising:
a safety cable comprising a first cable portion which is forced to move in a rearward direction of sad vehicle and to increase a cable tension of said safety cable by an engine of said vehicle when said engine is moved in said rearward direction in a head-on collision of said vehicle, a second cable portion for pulling a steering column of said vehicle in a forward direction o said vehicle when the cable tension of said safety cable is increased, and a third cable portion for applying a pulling force to a first seat belt assembly so as to increase a belt tension of said first seat belt assembly when the cable tension of said safety cable is increased while said first seat belt assembly is in a fastened state, said first, second and third cable portions being connected so as to form a single continuous line.

2. A safety system according to claim 1 wherein said second and third cable portions of said safety cable are connected in series so that a tension of said second cable portion is increased only when said third cable portion is tense, and that it is not possible to increase the tension of said second cable portion when said third cable portion is slack.

3. A safety system according to claim 1 wherein said second and third cable portions of said safety cable are connected in series so that said steering column is retracted by said safety cable only when said seat belt assembly is in said fastened state.

4. A safety system according to claim 1 wherein said safety cable has only first and second ends, and extends continuously from said first end to said second end, said first, second and third cable portions extending between said first and second ends so that a pulling force is transmitted from one of said first and second ends to the other through all of said first, second and third cable portions.

5. A safety system according to claim 4 wherein said third cable portion of said safety cable is connected with a seat belt of said first seat belt assembly so that said safety cable can pull said seat belt of said first seat belt assembly only when said first seat belt assembly is in said fastened state in which said seat belt is fastened to a belt connector of said first seat belt assembly, and said safety cable is disconnected from said seat belt of said first seat belt assembly when said first seat belt assembly is in a released state in which said seat belt is disconnected from said belt connector.

6. A safety system according to claim 5 wherein said third cable portion of said safety cable is connected with said belt connector of said first seat belt assembly, and said belt connector of said first seat belt assembly is a buckle.

7. A safety system according to claim 6 further comprising a first holding means for holding said first cable portion of said safety cable at a first normal position when said engine is located in a predetermined normal engine position and pulling said first cable portion from said first normal position in said rearward direction when said engine is moved from said normal engine position in said rearward direction, and a second holding means for holding said second cable portion of said safety cable at a second normal position when said steering column is in a normal column position, and receiving a pulling force in said forward direction from said second cable portion when the cable tension of said safety cable is increased.

8. A safety system according to claim 7 further comprising a supporting means for holding a fourth cable portion of said safety cable at a fourth position, and a fifth cable portion of said safety cable at a fifth position, said fourth cable portion being intermediate between said first and second cable portions, and said fifth cable portion being intermediate between said first and third cable portions, said fourth position being located forward of said first and second positions, and said fifth position being located forward of said first and third positions.

9. A safety system according to claim 8 wherein said supporting means is fixed to a main vehicle body structure of said vehicle, said first holding means is fixed to said engine so that said first holding means moves together with said engine in said rearward direction relative to said main body structure in a head-on collision of said vehicle, and said second holding means is fixed to said steering column so that said second holding means moves in said forward direction together with said steering column relative to said main body structure when said second holding means is pulled by said safety cable in said forward direction.

10. A safety system according to claim 9 wherein said second cable portion is intermediate between said first and third cable portions, and said first and third cable portions are connected through said second cable portion.

11. A safety system according to claim 10 wherein said second end of said safety cable is connected with a second seat belt assembly of said vehicle, said fifth cable portion is intermediate between said second and third cable portions, and said supporting means comprises a first support member having a smoothly curved outside surface around which each of said fourth and fifth cable portions is passed.

12. A safety system according to claim 11 wherein said supporting means further comprises a second support member having a smoothly curved outside surface around which a sixth cable portion of said safety cable is passed, said sixth cable portion being intermediate between said first cable portion and said second end of said safety cable.

13. A safety system according to claim 9 wherein said first cable portion is intermediate between said second and third cable portions, and said second and third cable portions are connected in series through said first cable portion.

14. A safety system according to claim 13 wherein said first cable end of said safety cable is connected with said steering column, and said second cable end of said safety cable is connected with said buckle of said first seat belt assembly.

15. A vehicle comprising:
a main vehicle body structure;
an engine assembly comprising a first holding means;
a steering column;
a first seat belt assembly for a driver's seat, said first seat belt assembly comprising a first seat belt, and a pair of a buckle and a tongue for fastening and releasing said first seat belt; and
a safety cable comprising a first cable portion which is hooked by said first holding means of said engine assembly and which is pulled by said first holding means in a rearward direction of said vehicle toward a rear end of said vehicle when said engine assembly is moved relative to said main body structure in said rearward direction on a head-on collision of said vehicle, a second cable portion which retracts said steering column in a forward direction opposite to said rearward direction by pulling said steering column when said first holding means increases a cable tension of said safety cable by pulling said first cable portion, and a third cable portion which pulls said first seat belt only when said tongue is fastened with said buckle, said first, second and third cable portions are connected in series so as to form a single continuous line.

* * * * *